US008892052B2

(12) United States Patent
Zeng et al.

(10) Patent No.: US 8,892,052 B2
(45) Date of Patent: Nov. 18, 2014

(54) METHODS FOR DETERMINING WHETHER A SIGNAL INCLUDES A WANTED SIGNAL AND APPARATUSES CONFIGURED TO DETERMINE WHETHER A SIGNAL INCLUDES A WANTED SIGNAL

(75) Inventors: Yonghong Zeng, Singapore (SG); Ser Wah Oh, Singapore (SG); Tran Phuoc Cuong Le, Singapore (SG); Weiqiang Zhang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 506 days.

(21) Appl. No.: 13/254,782

(22) PCT Filed: Mar. 2, 2010

(86) PCT No.: PCT/SG2010/000071

§ 371 (c)(1),
(2), (4) Date: Feb. 27, 2012

(87) PCT Pub. No.: WO2010/101527

PCT Pub. Date: Sep. 10, 2010

(65) Prior Publication Data

US 2012/0196552 A1 Aug. 2, 2012

(30) Foreign Application Priority Data

Mar. 3, 2009 (SG) .................................. 200901494

(51) Int. Cl.
*H04B 17/00* (2006.01)
*G10L 25/78* (2013.01)

(52) U.S. Cl.
CPC .................................... *G10L 25/78* (2013.01)
USPC ..... 455/67.11; 455/42; 455/150.1; 455/161.1

(58) Field of Classification Search
USPC ...................................................... 455/67.11
See application file for complete search history.

(56) References Cited

U.S. PATENT DOCUMENTS 6,480,823 B1 * 11/2002 Zhao et al. .................... 704/226
2010/0311341 A1 * 12/2010 Gaddam et al. ................ 455/42

* cited by examiner

*Primary Examiner* — Ajibola Akinyemi
(74) *Attorney, Agent, or Firm* — K. David Crockett, Esq.; Niky Economy Syrengelas, Esq.; Crockett & Crockett, PC

(57) ABSTRACT

In various embodiments, a method for determining whether a signal includes a wanted signal may be provided. The method may include determining a frequency at which the signal has a signal energy above a first pre-defined signal energy threshold and determining whether the signal includes a wanted signal, based on whether the signal has a signal energy above a second pre-defined signal energy threshold in a pre-defined frequency range in a frequency neighborhood of the determined frequency.

24 Claims, 6 Drawing Sheets

METHODS FOR DETERMINING WHETHER A SIGNAL INCLUDES A WANTED SIGNAL AND APPARATUSES CONFIGURED TO DETERMINE WHETHER A SIGNAL INCLUDES A WANTED SIGNAL

TECHNICAL FIELD

Embodiments relate to methods for determining whether a signal includes a wanted signal and apparatuses configured to determine whether a signal includes a wanted signal.

BACKGROUND

In various applications, it may be desired to know whether a signal includes a wanted signal. For example, when it is determined that a received signal does not include a wanted signal, it may be judged that the resources (for example frequencies, time slots, codes), which do not include a wanted signal, may be used for data transmission. This may lead to an efficient usage of the resources available.

SUMMARY

In various embodiments, a method for determining whether a signal includes a wanted signal may be provided. The method may include determining a frequency at which the signal has a signal energy above a first pre-defined signal energy threshold and determining whether the signal includes a wanted signal, based on whether the signal has a signal energy above a second pre-defined signal energy threshold in a pre-defined frequency range in a frequency neighborhood of the determined frequency.

In various embodiments, an apparatus configured to determine whether a signal includes a wanted signal may be provided. The apparatus may include a first determination circuit configured to determine a frequency at which the signal has a signal energy above a first pre-defined signal energy threshold and a second determination circuit configured to determine whether the signal includes a wanted signal, based on whether the signal has a signal energy above a second pre-defined signal energy threshold in a pre-defined frequency range in a frequency neighborhood of the determined frequency.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
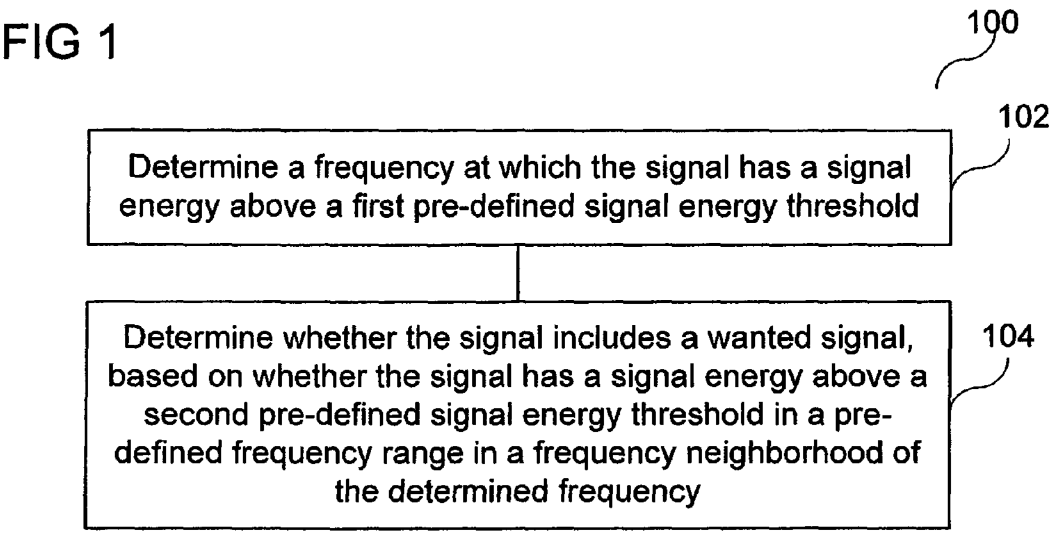
FIG. 1 shows a flow diagram illustrating a method for determining whether a signal includes a wanted signal in accordance with an embodiment.

In various embodiments, a method may be provided to detect if there is an signal of interest (in other words: a wanted signal, also referred to as useful signal) embedded in spurious interference and noise. The method may be based on received signal power spectral density or average amplitude of spectrum. The method may not need any information of channel response and noise power. Compared to commonly used energy detection, which may desire knowledge about exact noise power as a priori information, and which may be vulnerable to noise uncertainty and spurious interference, the method of identification of signal embedded in spurious and noise according to various embodiments may overcome the difficulties and therefore may simplify practical implementation and may be robust in changing environment.

In various embodiments, methods and systems may be provided to detect the existence of signal embedded in spurious interference and noises. The methods and systems may be used in cognitive radio, spectrum pooling, sensor network and other communication systems.

The following detailed description refers to the accompanying drawings that show, by way of illustration, specific details and embodiments in which the invention may be practiced. Other embodiments may be utilized and structural, logical, and electrical changes may be made without departing from the scope of the invention. The various embodiments are not necessarily mutually exclusive, as some embodiments can be combined with one or more other embodiments to form new embodiments. The following detailed description therefore, is not to be taken in a limiting sense, and the scope of the present invention is defined by the appended claims.

Various embodiments are provided for devices or apparatuses, and various embodiments are provided for methods. It will be understood that basic properties of the devices also hold for the methods and vice versa. Therefore, for sake of brevity, duplicate description of such properties may be omitted.

The word "exemplary" is used herein to mean "serving as an example, instance, or illustration". Any embodiment or design described herein as "exemplary" is not necessarily to be construed as preferred or advantageous over other embodiments or designs.

The apparatus according to various embodiments may include a memory which is for example used in the processing carried out by the image encoding apparatus. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The terms "coupling" or "connection" are intended to include a direct "coupling" or direct "connection" as well as an indirect "coupling" or indirect "connection", respectively.

In various embodiments, a (radio) resource of one or more (radio) resources will be understood as for example transmission frequency, transmission modulation scheme, transmission code, and/or transmission time slot, or any other feature of a transmitted signal.

In various applications, it may be desired to know whether a signal includes a wanted signal. For example, when it is determined that a received signal does not include a wanted signal, it may be judged that the resources (for example radio resource, e.g. mobile radio resources such as e.g. frequencies, time slots, codes), which do not include a wanted signal, may be used for data transmission. This may lead to an efficient usage of the resources available.

FIG. 1 shows a flow diagram 100 illustrating a method for determining whether a signal includes a wanted signal in accordance with an embodiment. In 102, a frequency may be determined at which the signal has a signal energy above a first pre-defined signal energy threshold. When determining whether the signal includes a wanted signal, it may be determined whether the signal includes a wanted signal, based on whether the signal has a signal energy above a second pre-defined signal energy threshold in a pre-defined frequency range in a frequency neighborhood of the determined frequency.

In various embodiments, determining a frequency at which the signal has a signal energy above a first pre-defined signal energy threshold may include performing a spectral transform of the signal to determine one or more spectral transform coefficients of the signal.

In various embodiments, determining a frequency at which the signal has a signal energy above a first pre-defined signal energy threshold may include computing a power of a norm of one or more spectral transform coefficients each representing a common pre-determined frequency as a preliminary frequency candidate characteristic for the common pre-determined frequency.

In various embodiments, performing the spectral transform of the signal may include dividing the signal into one or more signal blocks of a pre-determined length of time.

In various embodiments, performing the spectral transform of the signal further include performing a spectral transformation of each of the one or more signal blocks by computing one or more spectral transform coefficients of each of the one or more signal blocks.

In various embodiments, the spectral transformation may include a Fourier transformation. In various embodiments, spectral transformation may include a discrete Fourier transformation. In various embodiments, the spectral transformation may include a fast Fourier transformation. In various embodiments, the spectral transformation may include a discrete cosine transformation. In various embodiments, the spectral transformation may include a discrete sine transformation. In various embodiments, determining a frequency at which the signal has a signal energy above a first pre-defined signal energy threshold may further include determining for one or more frequency candidates whether the frequency of the frequency candidate is a frequency at which the signal has a signal energy above a first pre-defined signal energy threshold.

In various embodiments, a frequency candidate of the one or more frequency candidates may be a frequency represented by one of the one or more spectral transform coefficients. In various embodiments, each frequency candidate of the one or more frequency candidates may be a frequency represented by one of the one or more spectral transform coefficients. In various embodiments, each two neighboring frequency candidates may be separated by a frequency separation in a range from 100 Hz to 20 kHz. In various embodiments, each two neighboring frequency candidates may be separated by a frequency separation in a range from 1 kHz to 10 kHz. In various embodiments, each two neighboring frequency candidates may be separated by a frequency separation in a range from 2 kHz to 4 kHz.

In various embodiments, each two neighboring frequency candidates may be separated by a frequency separation of 2 kHz, for example 2048 Hz.

In various embodiments, each two neighboring frequency candidates may be separated by a frequency separation of 4 kHz.

In various embodiments, each two neighboring frequency candidates may be separated by a frequency separation of 8 kHz.

In various embodiments, determining a frequency at which the signal has a signal energy above a first pre-defined signal energy threshold may further include computing a power of a norm of corresponding coefficients for each corresponding spectral transform coefficient for the one or more signal blocks as a preliminary frequency candidate characteristic.

In various embodiments, the power may be the first power, and the norm may be the one-norm. In other words, the sum of the absolute values of the spectral transform coefficients may be computed. In various embodiments, the power may be the second power, and the norm may be the two-norm. In other words, the sum of the squares of the spectral transform coefficients may be computed.

In various embodiments, determining a frequency at which the signal has a signal energy above a first pre-defined signal energy threshold may further include computing the power spectral density (PSD) of the signal as a preliminary frequency candidate characteristic. In various embodiments, determining a frequency at which the signal has a signal energy above a first pre-defined signal energy threshold may further include computing the average amplitude (AAM) of the signal as a preliminary frequency candidate characteristic.

In various embodiments, determining a frequency at which the signal has a signal energy above a first pre-defined signal energy threshold may include pre-whitening of the signal to get a frequency candidate characteristic.

In various embodiments, pre-whitening may include multiplying the preliminary frequency candidate characteristic with a pre-determined factor.

In various embodiments, the pre-determined factor may be the power spectral density (PSD) for noise only. In various embodiments, the pre-determined factor may be the average amplitude (AAM) for noise only.

In various embodiments, determining a frequency at which the signal has a signal energy above a first pre-defined signal energy threshold may further include using the preliminary frequency candidate as a frequency candidate characteristic.

In various embodiments, determining a frequency at which the signal has a signal energy above a first pre-defined signal energy threshold may further include computing a statistical value of the distribution of the frequency candidate characteristic.

In various embodiments, the statistical value may be a mean value. In various embodiments, the statistical value may be a pre-defined quartile. In various embodiments, the statistical value may be a pre-defined decile. In various embodiments, the statistical value may be a pre-defined percentile. In various embodiments, the statistical value may be a median value.

In various embodiments, the statistical value may be computed from the preliminary frequency candidate, and the statistical value may then be pre-whitened.

In various embodiments, when determining a frequency at which the signal has a signal energy above a first pre-defined signal energy threshold, a frequency for which the frequency candidate characteristic is larger than a pre-determined threshold may be determined as a frequency at which the signal has a signal energy above a first pre-defined signal energy threshold.

In various embodiments, when determining a frequency at which the signal has a signal energy above a first pre-defined signal energy threshold, a frequency that fulfills a condition with respect to the computed statistical value may be determined as a frequency at which the signal has a signal energy above a first pre-defined signal energy threshold.

In various embodiments, when determining a frequency at which the signal has a signal energy above a first pre-defined signal energy threshold, a frequency for which the frequency candidate characteristic is a local maximum with respect to frequency candidate characteristics representing adjacent frequencies may be determined as a frequency at which the signal has a signal energy above a first pre-defined signal energy threshold.

In various embodiments, when determining a frequency at which the signal has a signal energy above a first pre-defined signal energy threshold, a frequency that fulfills a condition with respect to the computed statistical value may be determined as a frequency at which the signal has a signal energy above a first pre-defined signal energy threshold.

In various embodiments, the first pre-defined signal energy threshold may be based on the statistical value. In various embodiments, the first pre-defined signal energy threshold may be the statistical value multiplied with a pre-determined factor.

In various embodiments, the second pre-defined signal energy threshold may be pre-defined based on the signal energy of the frequency determined when determining a frequency at which the signal has a signal energy above a first pre-defined signal energy threshold. In various embodiments, the second pre-defined signal energy threshold may be the signal energy of the frequency determined when determining a frequency at which the signal has a signal energy above a first pre-defined signal energy threshold, multiplied by a pre-determined factor.

In various embodiments, the pre-determined factor may be in the range of 0.5 to 1.

In various embodiments, when determining whether the signal includes a wanted signal, the determination whether the signal has a signal energy above a second pre-defined signal energy threshold in a pre-defined frequency range in a frequency neighborhood of the determined frequency may include computing the standard deviation of the signal energies in the pre-defined frequency range.

In various embodiments, when determining whether the signal includes a wanted signal, the determination whether the signal has a signal energy above a second pre-defined signal energy threshold in a pre-defined frequency range in a frequency neighborhood of the determined frequency may include determining whether the computed standard deviation of the signal energies in the pre-defined frequency range is below a pre-determined threshold.

In various embodiments, the pre-defined frequency range may include a pre-determined number of frequencies each represented by one of the spectral transform coefficients.

In various embodiments, the pre-defined frequency range may include a pre-determined number of frequencies adjacent to the frequency determined when determining a frequency at which the signal has a signal energy above a first pre-defined signal energy threshold, each represented by one of the spectral transform coefficients.

In various embodiments, the number of pre-determined frequencies may be in the range from 5 to 20. In various embodiments, the number of pre-determined adjacent frequencies may be 10. In various embodiments, the signal energy of a frequency may include the frequency characteristic of the frequency.

In various embodiments, when determining whether the signal includes a wanted signal, it may be determined that the signal includes a wanted signal, if it is determined that the signal has a signal energy above a second pre-defined signal energy threshold in a pre-defined frequency range in a frequency neighborhood of the determined frequency.

In various embodiments, when determining whether the signal includes a wanted signal, it may be determined that the signal does not include a wanted signal, if it is determined that there is no signal that has a signal energy above a second pre-defined signal energy threshold in a pre-defined frequency range in a frequency neighborhood of the determined frequency. It will be understood that it may be determined that there does not exist a wanted signal, in case no frequency may be determined when determining a frequency at which the signal has a signal energy above a first pre-defined signal energy threshold.

In various embodiments, a method may be provided to detect if there is an signal of interest (in other words: a wanted signal) embedded in spurious interference and noise. The method may be based on received signal power spectral density or average amplitude of spectrum. The method may not need any information of channel response and noise power. Compared to commonly used energy detection, which may be vulnerable to noise uncertainty and spurious interference, methods according to various embodiments may overcome the difficulties and therefore may simplify practical implementation and may be robust in changing environment.

According to various embodiments, an signal of interest (in other words: a wanted signal) embedded in spurious and noise may be detected. According to various embodiments, an signal of interest may be differentiated from spurious and noise.

According to various embodiments, detection threshold may be set based on sample size. According to various embodiments, a detection threshold may not be related to noise power. According to various embodiments, detection performance may be robust to changing environment.

The methods according to various embodiments may reliably detect the occupancy or vacancy of a channel or frequency band in a cognitive radio or spectrum pooling system in a harsh environment with spurious interference and noise. Based on the reliable detection, it may be possible to opportunistically use the vacant channels for communication. Therefore, the technology may boost throughput or data rate for a communication system.

In various embodiments, TV (television) white space may be opportunistically used, for example, it may be listened (in other words: sensing may be performed) before it may be talked (in other words: before transmission is performed).

Figure 2:
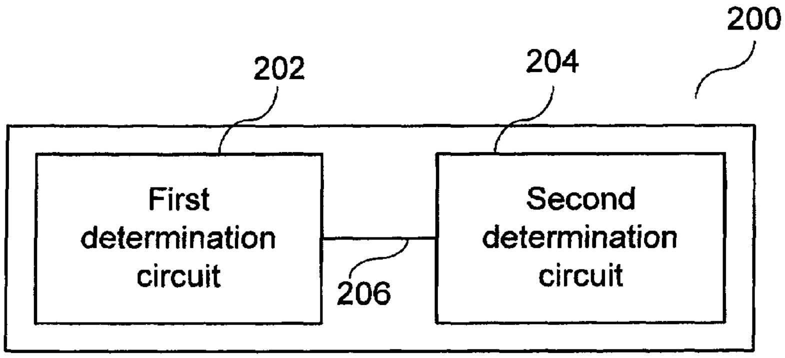
FIG. 2 shows an apparatus configured to determine whether a signal includes a wanted signal in accordance with an embodiment.

FIG. 2 shows an apparatus 200 configured to determine whether a signal includes a wanted signal in accordance with an embodiment. The apparatus may include a first determination circuit 202 configured to determine a frequency at which the signal has a signal energy above a first pre-defined signal energy threshold; and a second determination circuit 204 configured to determine whether the signal includes a wanted signal, based on whether the signal has a signal energy above a second pre-defined signal energy threshold in a predefined frequency range in a frequency neighborhood of the determined frequency. The first determination circuit 202 and the second determination circuit 204 may be coupled with each other, e.g. via an electrical connection 206 such as e.g. a cable or a computer bus or via any other suitable electrical connection to exchange electrical signals.

Figure 3:
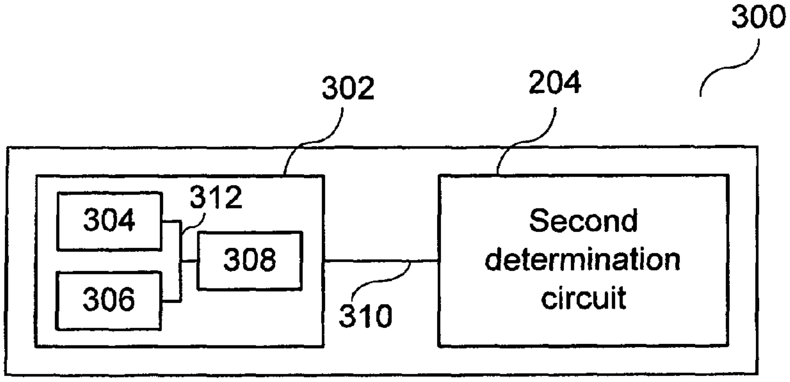
FIG. 3 shows an apparatus configured to determine whether a signal includes a wanted signal in accordance with an embodiment.

FIG. 3 shows an apparatus 300 configured to determine whether a signal includes a wanted signal in accordance with an embodiment. The apparatus 300, similar to the apparatus 200 of FIG. 2, may include a first determination circuit 302 and a second determination circuit 204. The first determination circuit 302 and the second determination circuit 204 may be coupled with each other, e.g. via a first electrical connection 310 such as e.g. a cable or a computer bus or via any other suitable electrical connection to exchange electrical signals.

In various embodiments, the first determination circuit 302 may include a spectral transform circuit 304 as will be explained below and/or a frequency candidate characteristic computation circuit 306 as will be explained below and/or a statistical value computation circuit 308. The spectral transform circuit 304 and/or the frequency candidate characteristic computation circuit 306 and/or the statistical value computation circuit 308 may be coupled with each other, e.g. via a second electrical connection 312 such as e.g. a cable or a computer bus or via any other suitable electrical connection to exchange electrical signals.

In various embodiments, the spectral transform circuit 304 may be configured to perform a spectral transform of the signal to determine one or more spectral transform coefficients of the signal.

In various embodiments, the spectral transform circuit 304 may be configured to, when performing the spectral transform of the signal, divide the signal into one or more signal blocks of a pre-determined length of time.

In various embodiments, the first determination circuit 304 may further be configured to compute a power of a norm of one or more spectral transform coefficients each representing a common pre-determined frequency as a preliminary frequency candidate characteristic for the common pre-determined frequency.

In various embodiments, the spectral transform circuit 304 may be configured to, when performing the spectral transform of the signal, further perform a spectral transformation of each of the one or more signal blocks by computing one or more spectral transform coefficients of each of the one or more signal blocks.

In various embodiments, the spectral transformation may include a Fourier transformation. In various embodiments, the spectral transformation may include a discrete Fourier transformation. In various embodiments, the spectral transformation may include a fast Fourier transformation. In various embodiments, the spectral transformation may include a discrete cosine transformation. In various embodiments, the spectral transformation may include a discrete sine transformation.

In various embodiments, the first determination circuit 302 may be further configured to determine for one or more frequency candidates whether the frequency of the frequency candidate is a frequency at which the signal has a signal energy above a first pre-defined signal energy threshold.

In various embodiments, a frequency candidate of the one or more frequency candidates may be a frequency represented by one of the one or more spectral transform coefficients. In various embodiments, each frequency candidate of the one or more frequency candidates may be a frequency represented by one of the one or more spectral transform coefficients.

In various embodiments, each two neighboring frequency candidates may be separated by a frequency separation in a range from 100 Hz to 20 kHz. In various embodiments, each two neighboring frequency candidates may be separated by a frequency separation in a range from 1 kHz to 10 kHz. In various embodiments, each two neighboring frequency candidates may be separated by a frequency separation in a range from 2 kHz to 4 kHz. In various embodiments, each two neighboring frequency candidates may be separated by a frequency separation of 2 kHz. In various embodiments, each two neighboring frequency candidates may be separated by a frequency separation of 2048 Hz. In various embodiments, each two neighboring frequency candidates may be separated by a frequency separation of 4 kHz.

In various embodiments, the first determination circuit may further be configured to compute a power of a norm of corresponding coefficients for each corresponding spectral transform coefficient for the one or more signal blocks as a preliminary frequency candidate characteristic.

In various embodiments, the power may be the first power, and the norm may be the one-norm. In various embodiments, the power may be the second power, and the norm may be the two-norm. In various embodiments, the frequency candidate characteristic computation circuit 306 may be configured to compute at least one of the power spectral density (PSD) of the signal and the average amplitude (AAM) of the signal as a preliminary frequency candidate characteristic.

In various embodiments, the first determination circuit 302 may be further configured to perform at least one of the following: pre-whiten of the signal to get a frequency candidate characteristic and use the preliminary frequency candidate as a frequency candidate characteristic. In various embodiments, pre-whitening may include multiplying the preliminary frequency candidate characteristic with a predetermined factor.

In various embodiments, the pre-determined factor may be the power spectral density (PSD) for noise only. In various embodiments, the pre-determined factor may be the average amplitude (AAM) for noise only.

In various embodiments, the statistical value computation circuit 308 may be configured to compute a statistical value of the distribution of the frequency candidate characteristic. In various embodiments, the statistical value may be a mean value. In various embodiments, the statistical value may be a pre-defined quartile. In various embodiments, the statistical value may be a pre-defined decile. In various embodiments, the statistical value may be a pre-defined percentile. In various embodiments, the statistical value may be a median value.

In various embodiments, the first determination circuit 302 may be further configured to determine a frequency for which the frequency candidate characteristic is larger than a pre-determined threshold as a frequency at which the signal has a signal energy above a first pre-defined signal energy threshold.

In various embodiments, the first determination circuit 302 may further be configured to determine a frequency that fulfills a condition with respect to the computed statistical value as a frequency at which the signal has a signal energy above a first pre-defined signal energy threshold.

In various embodiments, the first determination circuit may further be configured to determine a frequency for which the frequency candidate characteristic is a local maximum with respect to frequency candidate characteristics representing adjacent frequencies as a frequency at which the signal has a signal energy above a first pre-defined signal energy threshold.

In various embodiments, the first determination circuit 302 may further be configured to determine a frequency that fulfills a condition with respect to the computed statistical value as a frequency at which the signal has a signal energy above a first pre-defined signal energy threshold.

In various embodiments, the first pre-defined signal energy threshold may be based on the statistical value.

In various embodiments, the first pre-defined signal energy threshold may be the statistical value multiplied with a pre-determined factor.

In various embodiments, the second pre-defined signal energy threshold may be pre-defined based on the signal energy of the frequency determined by the first determination circuit 302.

In various embodiments, the second pre-defined signal energy threshold may be the signal energy of the frequency determined by the first determination circuit 302 multiplied by a pre-determined factor.

In various embodiments, the pre-determined factor is in the range of 0.5 to 1.

In various embodiments, the second determination circuit 302 may further be configured to, when determining whether the signal has a signal energy above a second pre-defined signal energy threshold in a pre-defined frequency range in a frequency neighborhood of the determined frequency, further compute the standard deviation of the signal energies in the pre-defined frequency range.

In various embodiments, the second determination circuit 302 may further be configured to, when determining whether the signal has a signal energy above a second pre-defined signal energy threshold in a pre-defined frequency range in a frequency neighborhood of the determined frequency, further determine whether the computed standard deviation of the signal energies in the pre-defined frequency range is below a pre-determined threshold.

In various embodiments, the pre-defined frequency range may include a pre-determined number of frequencies each represented by one of the spectral transform coefficients.

In various embodiments, the pre-defined frequency range may include a pre-determined number of frequencies adjacent to the frequency determined by the first determination circuit 302, each represented by one of the spectral transform coefficients.

In various embodiments, the number of pre-determined frequencies may be in the range from 5 to 20.

In various embodiments, the number of pre-determined adjacent frequencies may be 10.

In various embodiments, the signal energy of a frequency may include the frequency characteristic of the frequency.

In various embodiments, the second determination circuit 302 may further be configured to determine that the signal includes a wanted signal, if it determines that the signal has a signal energy above a second pre-defined signal energy threshold in a pre-defined frequency range in a frequency neighborhood of the determined frequency.

According to various embodiments, a method and system to detect the occupancy or vacancy of a channel or frequency band with possible spurious interferences without knowledge of the channel and noise power may be provided.

Various embodiments may be applied in cognitive radio, sensor network, and any wired or wireless communication system which may use sensing based multiple access. Various embodiments may be used for sensing (for example signal detection of) a channel or frequency band when there is no knowledge of the channel and noise power.

According to various embodiments, a method may include the following:

- Compute the power spectral density (PSD) or the average amplitude (AAM) in frequency, as will be explained in more detail below, of the received signal;
- Pre-whiten the PSD or AAM, as will be explained in more detail below;
- Find possible frequency locations of signal and spurious; and
- Check all the locations to see if signal or spurious is there.

In various embodiments, spurious and interference may be present. For example, a received signal may not only contain a desired signal and white noise, but also some spurious signal and interference.

Commonly used detection methods may not differentiate such undesired signals with desired signal. This may increase the probability of false alarm. According to various embodiments, a new method may be provided to detect desired signal and at the same time reject spurious signal.

In various embodiments, a frequency location of a spurious signal may be unknown. In various embodiments, it may be anywhere within a channel.

In various embodiments, there may be multiple spurious signals within the same channel.

In various embodiments, a signal strength of a spurious may be unknown.

In various embodiments, a channel response and frequency offset may be unknown. This may cause coherent detection to be unreliable in commonly used methods.

According to various embodiments, a method with low complexity, for example low computational complexity, may be provided, and may be easy for implementation.

In various embodiments, two hypotheses (for example "wanted signal present" and "wanted signal not present") may be checked, as will be explained in the following.

For example, let y(t) be a continuous time received signal. It may be assumed that the frequency band with central frequency $f_c$ and bandwidth W may be the frequency band of interest. In various embodiments, the received signal y(t) may be sampled at a sampling rate $f_s$, for example where $f_s \geq W$. $T_s = 1/f_s$ may be the sampling period. The received discrete signal may then be $x(n)=y(nT_s)$. There may be two hypotheses: $H_0$: signal does not exist; and $H_1$: signal exists. The received signal samples under the two hypotheses may be therefore respectively as follows:

$$H_0 : x(n) = \eta(n) + \sum_{i=1}^{K} \rho_i(n) \text{ and}$$

$$H_1 : x(n) = s(n) + \eta(n) + \sum_{i=1}^{K} \rho_i(n),$$

where s(n) may be the transmitted signal (in other words: the wanted signal) passed through a wireless channel (including fading and multipath effect), $\rho_i(n)$ may be a possible spurious signal and $\eta(n)$ may be the white noise samples. In various embodiments, s(n) may be the superposition of multiple signals. The spurious signal $\rho_i(n)$ may be an extremely narrowband signal. Commonly used detection algorithms may not differentiate the transmitted signal s(n) and spurious signal $\rho_i(n)$. Therefore, these algorithms may produce false alarm when spurious signal presents, that is, even if an signal of interest is not presents, the algorithms may wrongly report "signal present" due to the interference of the spurious signals.

The methods and apparatuses according to various embodiments provide good detection results. According to various embodiments, a detection algorithm based on power spectrum density or FFT of the received signal to identify signal of interests from spurious and noise may be provided.

In the following, computation of the PSD and AAM, as may be used in various embodiments, will be described in more detail.

Let N be the number of received signal samples. The signal samples may be divided into blocks of length M, where M may be the FFT size. Let the $x_m(n)$ for example be defined as follows:

$$x_m(n)=x(mM+n),\ m=0, 1, \ldots, N/M-1; n=0, 1, \ldots, M-1.$$

Let $X_m(k)$ for example be the FFT (fast Fourier transform) of $x_m(n)$, k=0, 1, . . . , M−1. The PSD of the received signal may be defined as $$P_x(n) = \sum_{m=0}^{N/M-1} |X_m(n)|^2,\ n = 0, 1, \ldots, M-1.$$

In various embodiments, the average amplitude (AAM) defined as $$A_x(n) = \sum_{m=0}^{N/M-1} |X_m(n)|,\ n = 0, 1, \ldots, M-1$$

may be used.

For white noise signal, the PSD or the AAM may be a constant for n=0, 1, . . . , M−1. For a spurious signal, the PSD or the AAM may be constrained in J subcarriers only, where J may be a parameter related to the FFT size M, the channel bandwidth considered, and the probability of false alarm. For an signal of interest, its PSD or the AAM may be spread into more than J subcarriers.

Figure 4:
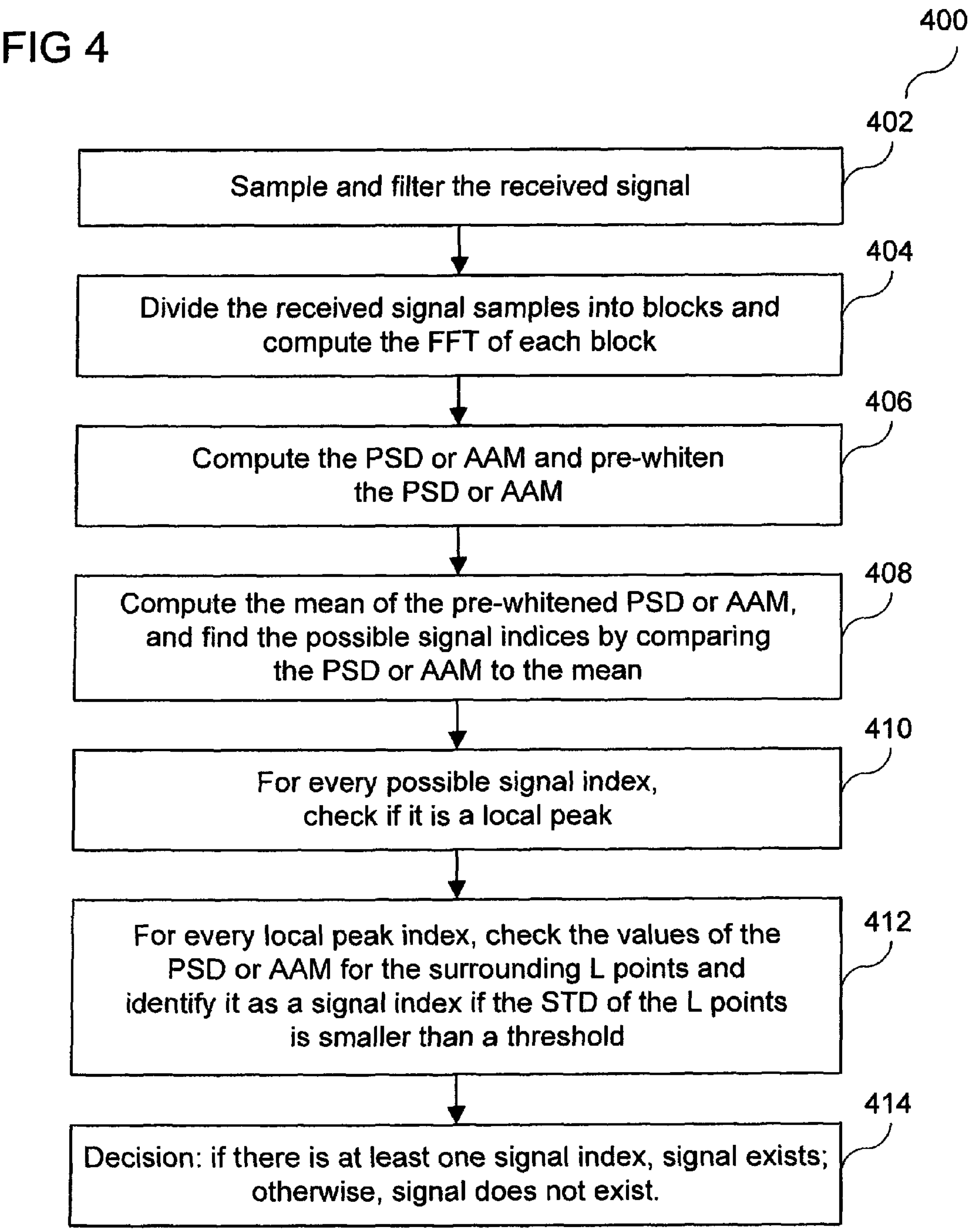
FIG. 4 shows a flow diagram illustrating a method for determining whether a signal includes a wanted signal in accordance with an embodiment.

FIG. 4 shows a flow diagram 400 illustrating a method for determining whether a signal (for example a received signal) includes a wanted signal in accordance with an embodiment.

In the flow-chart 400 of the identification of signal embedded in spurious and noise, several items are shown. However, it will be understood, that not all of them have to be performed, and that additional items may be present.

In 402, the received signal may be sampled and filtered as described above.

In 404, the received signal samples may be divided into blocks, for example of length M, and the FFT of each block may be computed.

In 406, the PSD or the AAM may be computed, for example by averaging on the FFT output as described above, and the PSD or AAM may be pre-whitened, for example by dividing the PSD by the noise PSD or by dividing the AAM by the noise AAM.

In more detail, the pre-whitening may be performed as follows:

$$\hat{P}_x(n)=P_x(n)/W(n),\ \hat{A}_x(n)=A_x(n)/W(n),$$

where W(n) may be the PSD or the AAM for noise only.

In 408, the mean of the pre-whitened PSD or AAM may be computed, and the possible signal indices may be found by comparing the PSD or AAM to the mean. For example, the PSD or AAM may be compared with the mean, and all indices, such that the PSD or AAM is larger than a threshold times the mean may be found.

In more detail, the mean value of the pre-whitened PSD or AAM may be computed and defined it as $\Lambda_{mean}$. Then, all indices n may be found such that $$\hat{P}_x(n)>\gamma_1\Lambda_{mean} \text{ or } \hat{A}_x(n)>\gamma_1\Lambda_{mean},$$

Where $\Gamma_1$ may be a threshold which may be set based on the requirement on probability of false alarm. For example, let the set of such indices be Ω, which may contain all possible signal indices.

In 410, for every possible signal/spurious index, it may be checked if it is a local peak. It is to be noted that for a detected signal/spurious index, the frequency may be a frequency related to a signal of interest or to spurious. In accordance with various embodiments, further determination may be made to determine whether the frequency related to the signal/spurious index is related to a signal of interest or to spurious.

In more detail, for every index n in Ω, it may be checked whether $\hat{P}_x(n)$ is a local peak, for example it may be checked whether $\hat{P}_x(n-1)<\hat{P}_x(n)$ and $\hat{P}_x(n+1)<\hat{P}_x(n)$.

In 412, for every local peak index (for example as determined in 410), the values of the PSD or AAM or the pre-whitened PSD or the pre-whitened AAM may be checked for surrounding points, for example for the surrounding L points with a pre-determined number L, and it may be identified as a signal index if the STD of the surrounding points, for example the L points, is smaller than a threshold $\gamma_2$, for example a pre-defined threshold $\gamma_2$.

In 414, a decision may be made: if there is at least one signal index, a signal exists; otherwise, signal does not exist. In other words: if there is at least one signal index, it may be determined that a signal exists; otherwise, it may be determined that a signal does not exist.

In the following, simulation results for various methods and apparatuses according to various embodiments will be described.

For example, the following simulation settings may be used:

Channel bandwidth: 6 MHz;

Sampling rate: 24.75 MHz;

FFT size: 2048;

Sensing time: 8.3 ms (for example, an average on 100 FFTs is computed, for example using PSD or AAM as described above); and Probability of false alarm: 0.01, for example, the thresholds and other parameters as described above may be set so that the method provides a probability of false alarm of 0.01.

As will be explained in more detail below, the simulations show that the methods and apparatuses according to various embodiments may effectively detect the desired signal while at the same time reject the spurious signal. The methods and apparatuses may not need any information on the signal, channel and noise power.

Figure 5:
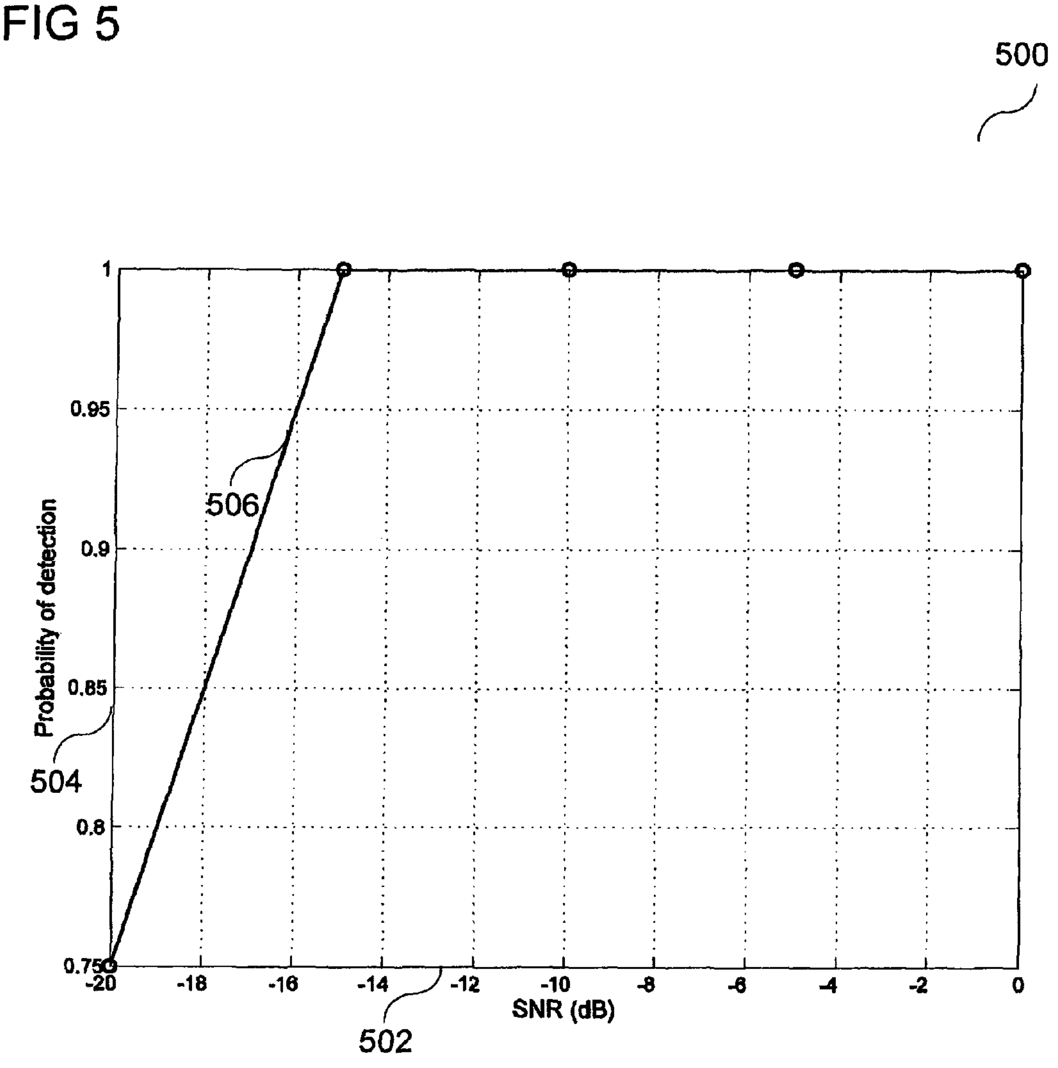
FIG. 5 shows a diagram illustrating the detection performance for a frequency modulated signal in accordance with an embodiment.

FIG. 5 shows a diagram 500 illustrating the detection performance for a frequency modulated signal in accordance with an embodiment. A plot 506 showing the relation between the signal to noise ratio (SNR) in dB indicated by a first axis 502, and a probability of detection indicated by a second axis 504 is shown.

As indicated by plot 506, the probability of detection may increase with increasing SNR, and from a SNR of about −15 dB, the probability of detection may be approximately 1, i.e. a signal may approximately always be detected if it is present.

Figure 6:
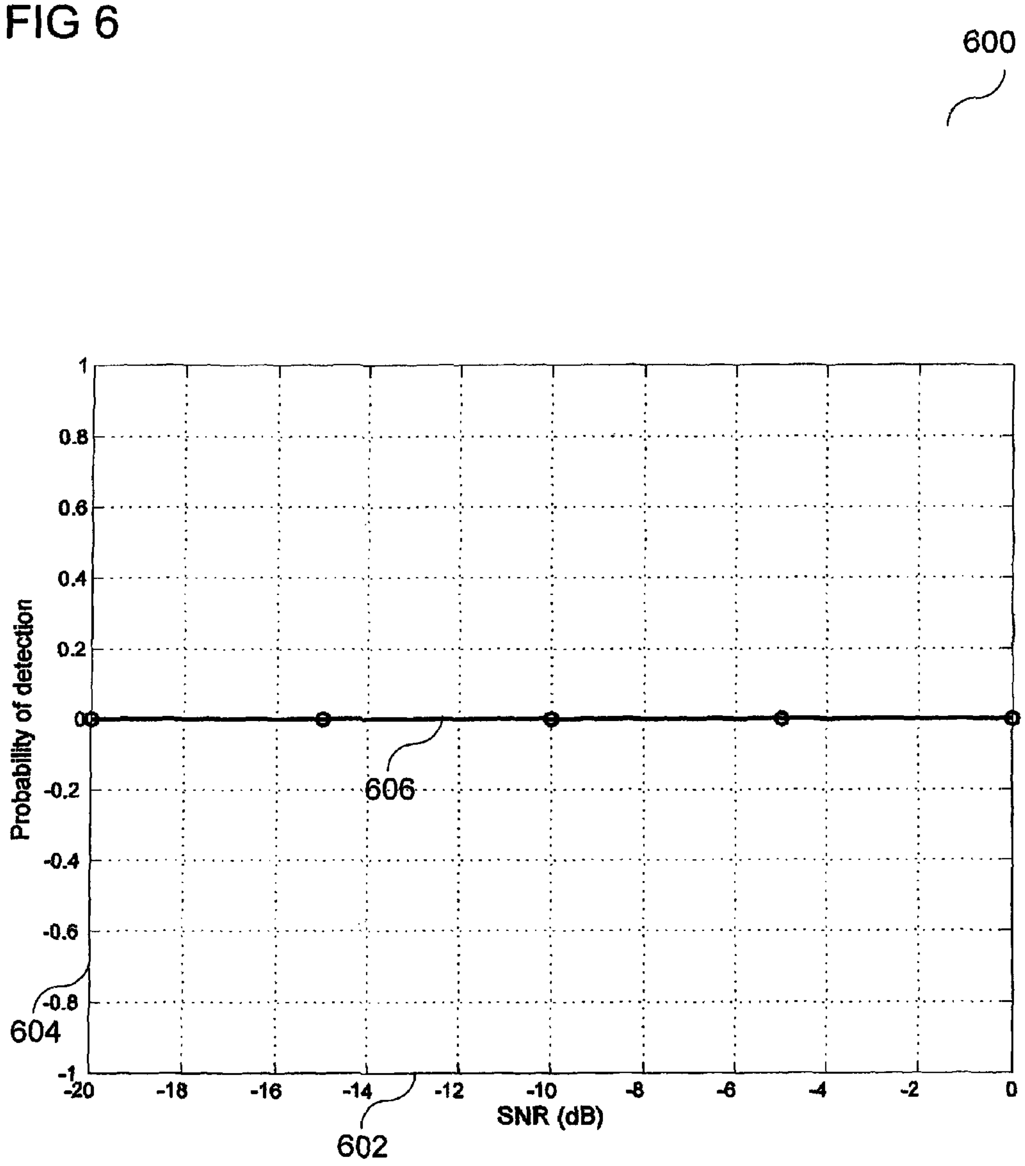
FIG. 6 shows a diagram illustrating the detection performance for SC (Single Carrier) signals in accordance with an embodiment.

FIG. 6 shows a diagram illustrating the detection performance for SC (Single Carrier) signals (for example simulated spurious signal, interference) in accordance with an embodiment. A plot 606 showing the relation between the signal to noise ratio (SNR) in dB indicated by a first axis 602, and a probability of detection indicated by a second axis 604 is shown.

Figure 7:
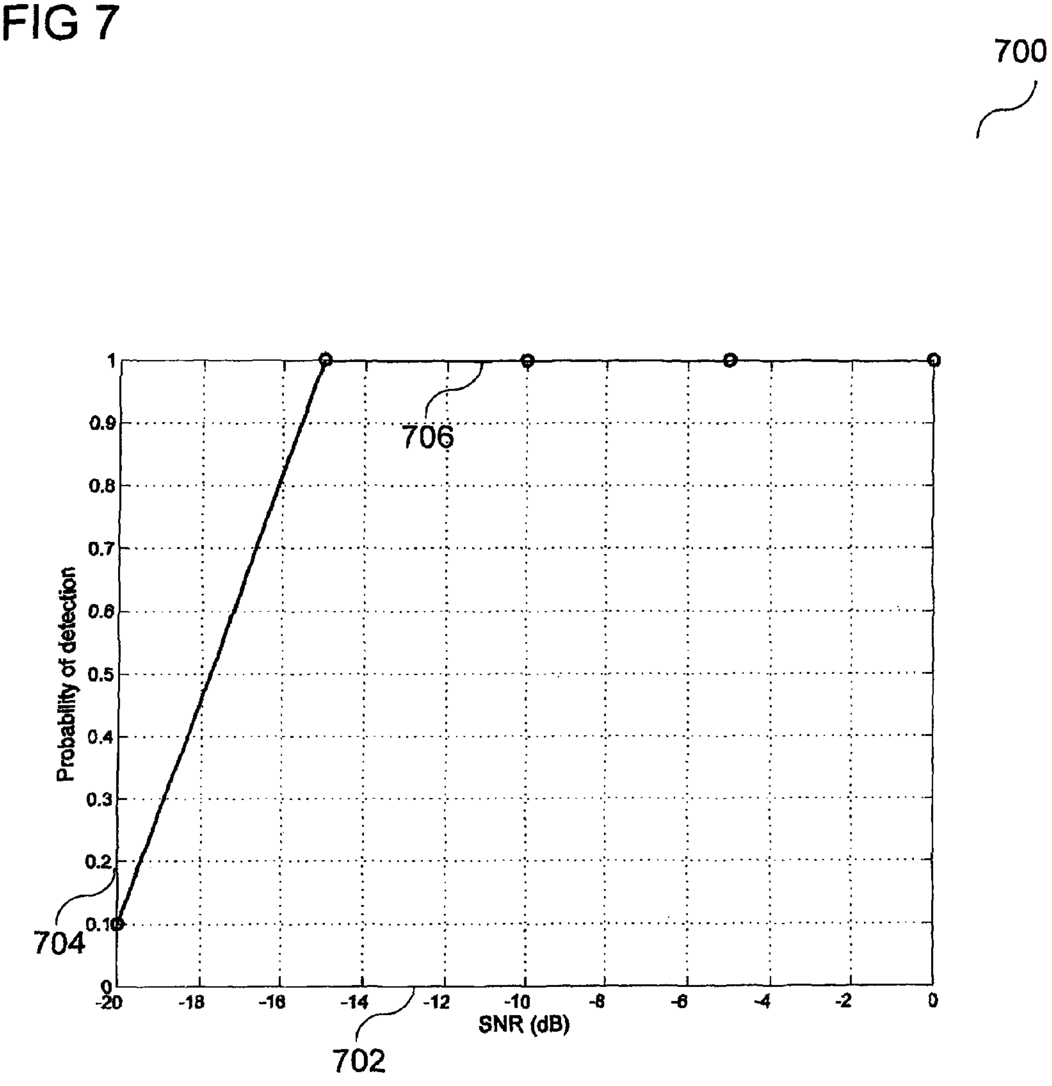
FIG. 7 shows a diagram illustrating the detection performance where a frequency modulated signal is the desired signal and single carrier signal is the interference (spurious signal) in accordance with an embodiment, where the interference to noise ratio (INR) is 0 dB.

FIG. 7 shows a diagram illustrating the detection performance for a frequency modulated (FM) signal when SC interference exists in accordance with an embodiment. For example, a FM signal plus spurious (SC signal) is present, wherein the FM is the desired (in other words: wanted) signal. The interference to noise ratio (INR) is 0 dB at this case. A plot 706 showing the relation between the signal to noise ratio (SNR) in dB indicated by a first axis 702, and a probability of detection indicated by a second axis 704 is shown.

As indicated by plot 706, the probability of detection may increase with increasing SNR, and from a SNR of about −15 dB, the probability of detection may be approximately 1, i.e. a signal may approximately always be detected if it is present.

Figure 8:
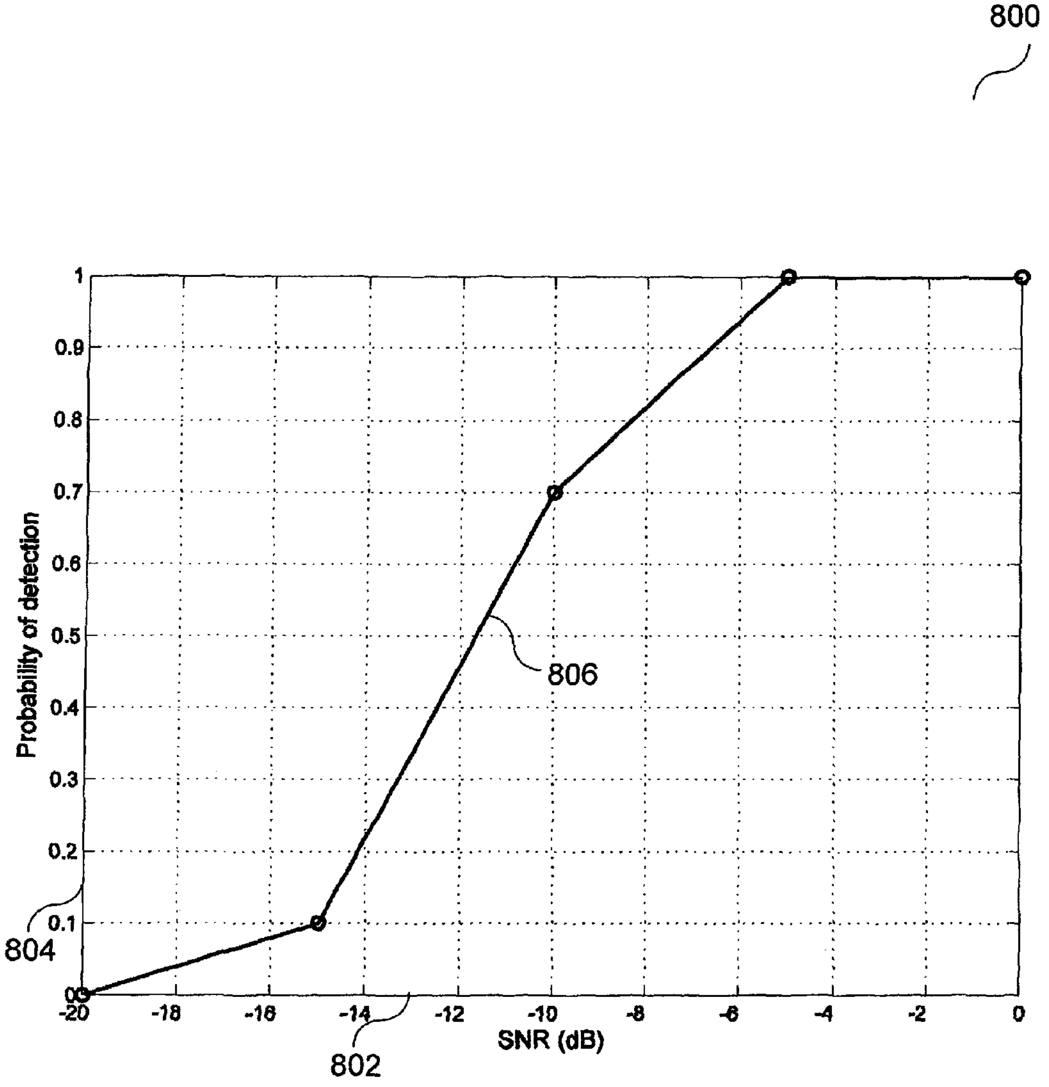
FIG. 8 shows a diagram illustrating the detection performance where a frequency modulated signal is the desired signal and single carrier signal is the interference (spurious signal) in accordance with an embodiment, where the interference to noise ratio (INR) is 10 dB.

FIG. 8 shows a diagram illustrating the detection performance for a frequency modulated signal when SC interference exists in accordance with an embodiment. For example, a FM signal plus spurious is present, wherein the FM is the desired (in other words: wanted) signal. The interference to noise ratio (INR) is 10 dB at this case. A plot 806 showing the relation between the signal to noise ratio (SNR) in dB indicated by a first axis 802, and a probability of detection indicated by a second axis 804 is shown.

As indicated by plot 806, the probability of detection may increase with increasing SNR, and from a SNR of about −5 dB, the probability of detection may be approximately 1, i.e. a signal may approximately always be detected if it is present.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for determining whether a signal comprises a wanted signal, the method comprising:

determining a frequency at which the signal has a signal energy above a first pre-defined signal energy threshold;

determining whether the signal comprises a wanted signal, based on whether the signal has a signal energy above a second pre-defined signal energy threshold in a pre-defined frequency range in a frequency neighborhood of the determined frequency; and wherein determining a frequency at which the signal has a signal energy above a first pre-defined signal energy threshold comprises at least one of pre-whitening of the signal to get a frequency candidate characteristic and using the preliminary frequency candidate as a frequency candidate characteristic.

2. The method of claim 1, wherein determining a frequency at which the signal has a signal energy above a first pre-defined signal energy threshold comprises performing a spectral transform of the signal to determine one or more spectral transform coefficients of the signal.

3. The method of claim 2, wherein determining a frequency at which the signal has a signal energy above a first pre-defined signal energy threshold comprises computing a power of a norm of one or more spectral transform coefficients each representing a common pre-determined frequency as a preliminary frequency candidate characteristic for the common pre-determined frequency.

4. The method of claim 2, wherein the pre-defined frequency range comprises a pre-determined number of frequencies each represented by one of the spectral transform coefficients.

5. The method of claim 1, wherein determining a frequency at which the signal has a signal energy above a first pre-defined signal energy threshold further comprises computing at least one of the power spectral density of the signal and the average amplitude of the signal as a preliminary frequency candidate characteristic.

6. The method of claim 1, wherein determining a frequency at which the signal has a signal energy above a first pre-defined signal energy threshold further comprises computing a statistical value of the distribution of the frequency candidate characteristic.

7. The method of claim 6, wherein when determining a frequency at which the signal has a signal energy above a first pre-defined signal energy threshold, a frequency that fulfills a condition with respect to the computed statistical value is determined as a frequency at which the signal has a signal energy above a first pre-defined signal energy threshold.

8. The method of claim 1, wherein when determining a frequency at which the signal has a signal energy above a first pre-defined signal energy threshold, a frequency for which the frequency candidate characteristic is larger than a pre-determined threshold is determined as a frequency at which the signal has a signal energy above a first pre-defined signal energy threshold.

9. The method of claim 1, wherein when determining a frequency at which the signal has a signal energy above a first pre-defined signal energy threshold, a frequency for which the frequency candidate characteristic is a local maximum with respect to frequency candidate characteristics representing adjacent frequencies is determined as a frequency at which the signal has a signal energy above a first pre-defined signal energy threshold.

10. The method of claim 1, wherein the second pre-defined signal energy threshold is pre-defined based on the signal energy of the frequency determined when determining a frequency at which the signal has a signal energy above a first pre-defined signal energy threshold.

11. The method of claim 10, wherein when determining whether the signal comprises a wanted signal, the determination whether the signal has a signal energy above a second pre-defined signal energy threshold in a pre-defined frequency range in a frequency neighborhood of the determined frequency comprises determining whether a standard deviation of the signal energies in the pre-defined frequency range is below a pre-determined threshold.

12. The method of claim 1, wherein when determining whether the signal comprises a wanted signal, it is determined that the signal comprises a wanted signal, if it is determined that the signal has a signal energy above a second pre-defined signal energy threshold in a pre-defined frequency range in a frequency neighborhood of the determined frequency.

13. An apparatus configured to determine whether a signal comprises a wanted signal, the apparatus comprising:

a first determination circuit configured to determine a frequency at which the signal has a signal energy above a first pre-defined signal energy threshold;

a second determination circuit configured to determine whether the signal comprises a wanted signal, based on whether the signal has a signal energy above a second pre-defined signal energy threshold in a pre-defined frequency range in a frequency neighborhood of the determined frequency; and wherein the first determination circuit is further configured to perform at least one of the following: pre-whiten of the signal to get a frequency candidate characteristic and use the preliminary frequency candidate as a frequency candidate characteristic.

14. The apparatus of claim 13, wherein the first determination circuit comprises a spectral transform circuit configured to perform a spectral transform of the signal to determine one or more spectral transform coefficients of the signal.

15. The apparatus of claim 14, wherein the first determination circuit is further configured to compute a power of a norm of one or more spectral transform coefficients each representing a common pre-determined frequency as a preliminary frequency candidate characteristic for the common pre-determined frequency.

16. The apparatus of claim 15, wherein the first determination circuit further comprises a frequency candidate characteristic computation circuit configured to compute at least one of the power spectral density of the signal and the average amplitude of the signal as a preliminary frequency candidate characteristic.

17. The apparatus of claim 14, wherein the pre-defined frequency range comprises a pre-determined number of frequencies each represented by one of the spectral transform coefficients.

18. The apparatus of claim 13, wherein the first determination circuit further comprises a statistical value computation circuit configured to compute a statistical value of the distribution of the frequency candidate characteristic.

19. The apparatus of claim 18, wherein the first determination circuit is further configured to determine a frequency that fulfills a condition with respect to the computed statistical value as a frequency at which the signal has a signal energy above a first pre-defined signal energy threshold.

20. The apparatus of claim 13, wherein the first determination circuit is further configured to determine a frequency for which the frequency candidate characteristic is larger than a pre-determined threshold as a frequency at which the signal has a signal energy above a first pre-defined signal energy threshold.

21. The apparatus of claim 13, wherein the first determination circuit is further configured to determine a frequency for which the frequency candidate characteristic is a local maximum with respect to frequency candidate characteristics representing adjacent frequencies as a frequency at which the signal has a signal energy above a first pre-defined signal energy threshold.

22. The apparatus of claim 13, wherein the second pre-defined signal energy threshold is pre-defined based on the signal energy of the frequency determined by the first determination circuit.

23. The apparatus of claim 22, wherein the second determination circuit is further configured to, when determining whether the signal has a signal energy above a second pre-defined signal energy threshold in a pre-defined frequency range in a frequency neighborhood of the determined frequency, determine whether a standard deviation of the signal energies in the pre-defined frequency range is below a pre-determined threshold.

24. The apparatus of claim 13, wherein the second determination circuit is further configured to determine that the signal comprises a wanted signal, if it determines that the signal has a signal energy above a second pre-defined signal energy threshold in a pre-defined frequency range in a frequency neighborhood of the determined frequency.

* * * * *